United States Patent Office 3,278,484
Patented Oct. 11, 1966

3,278,484
ORGANOSILICON COMPOUNDS, METHODS OF PREPARATION AND USE
Giuliana C. Tesoro, Dobbs Ferry, N.Y., assignor to J. P. Stevens & Co., Inc., New York, N.Y., a corporation of Delaware
No Drawing. Filed Jan. 16, 1963, Ser. No. 251,741
35 Claims. (Cl. 260—46.5)

The present invention relates to monomeric and polymeric organosilicon compounds containing sulfur, preferably in the form of mercaptan or disulfide. In the preferred class of compounds, the silicon atom is separated from the sulfur atom by at least one carbon atom. One aspect of the invention relates to such compounds in which a hydrolyzable group is attached to the silicon. The invention also relates to methods of preparation of organosilicon compounds of the type described above. The invention relates further to the use of such organosilicon compounds for the treatment of surfaces, such as glass, and for the bonding of surfaces such as glass, to a substance having affinity for sulfur in mercaptan or disulfide form.

In order to form a bond on a surface such as glass it is generally acknowledged that a compound containing a silicon atom is desirable. Preferably, a hydrolyzable radical, for example an alkoxy radical, should be attached to the silicon atom. This is recognized to provide, in general, a stronger bond.

The sulfur atom, in the form of mercaptan or disulfide, is known to possess an affinity for certain hydrocarbon linkages and a reactivity with certain functional groups. Compounds containing such sulfur atoms are used for vulcanizing and other reactions. Thus, a compound containing both a silicon atom and a sulfur atom, the latter in the form of mercaptan or disulfide, would be suitable for bonding certain polymeric structures to a surface such as glass. Such a compound would be generally suitable for bonding any substances or compounds which have an affinity for sulfur.

Although many organofunctional silanes are known in the art, considerable difficulty has been encountered in attempts to prepare compounds which contain a mercaptan group which is reactive. The difficulties encountered by the prior art workers in attempts to prepare organofunctional silanes containing a reactive sulfur group have ben due to the fact that known reactions for introducing mercaptan radicals into organic compounds are generally carried out under conditions which induce hydrolysis and/or polymerization of alkoxy silanes. Thus, the desirable reactivity of the alkoxy silane substituents is lost during the reaction in which the sulfur is introduced into the molecule.

Accordingly, it is an object of the present invention to provide a novel group of organosilicon compounds containing sulfur in the form of mercaptans or disulfide.

A further object of the present invention is to provide organosilicon compounds containing sulfur in the form of mercaptan or disulfide in which a hydrolyzable radical is attached to the silicon atom.

It is a further object of this invention to provide methods of preparation of the above organosilicon compounds.

It is a further object of the present invention to provide processes in which the compounds of the present invention are used to treat glass and similar surfaces.

It is an additional object of the present invention to provide compounds suitable for use in bonding glass to vulcanizable substances, such as rubber.

In view of the complicated nature of the chemistry involved in the monomeric and polymeric compounds of the present invention, it is believed desirable to classify the various compounds contemplated by the present invention into categories, which, although artificial, will simplify the discussion of the invention. Many of the monomeric compounds contemplated by the present invention are polyfunctional, and accordingly these compounds can polymerize in many different ways to produce different polymers. In many instances, the polymers are prepared prior to use, and in other instances the polymers may be formed in situ.

The following section of this specification is devoted to a discussion of the compounds of the present invention which are in monomeric form, and is also devoted to the methods of preparation thereof.

MONOMERS

Compounds of the present invention in monomeric form may be produced by the following reaction:

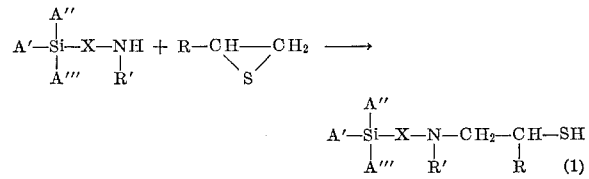
(1)

where A', A" and A''' are selected from the group consisting of substituted and unsubstituted aliphatic, aryl, aralkyl and alkoxy radicals; X is selected from the group consisting of a divalent organic radical having terminal carbon atoms and —CH$_2$—; R is selected from the group consisting of hydrogen, substituted and unsubstituted aliphatic, aryl and aralkyl radicals; and R' is selected from the group consisting of hydrogen, substituted and unsubstituted aliphatic radicals, and the following group:

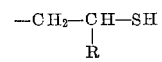

With respect to the radical in the above R' group for which the structural formula is given, it can be seen that this radical will be present in the organofunctional silane molecule in those instances in which the molecule has already reacted with a sulfur-containing compound so that one of the two hydrogens attached to the nitrogen atom would have already been replaced. This will be discussed below.

A typical example of the reaction set forth in Equation 1 above is as follows:

(Triethoxy-gamma aminopropyl silane)   (Ethylene sulfide)

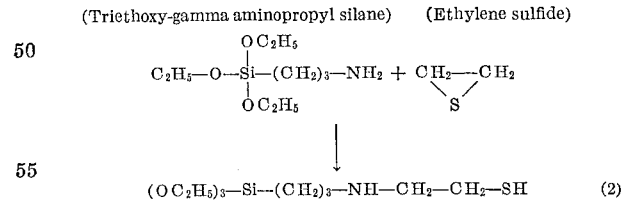

(O C$_2$H$_5$)$_3$—Si—(C H$_2$)$_3$—NH—C H$_2$—C H$_2$—SH   (2)

Instead of the ethylene sulfide, as shown in Equation 2 above, ethylene monothiol carbonate may be used:

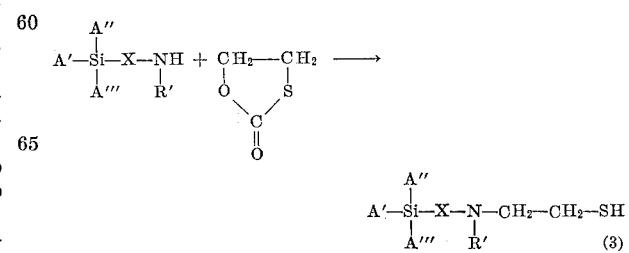
(3)

In Equation 3 above, A', A" and A''', X and R' are as discussed in connection with Equation 1 above.

Also suitable for use in forming monomeric compounds of the present invention is ethyl-2-mercapto ethyl carbonate:

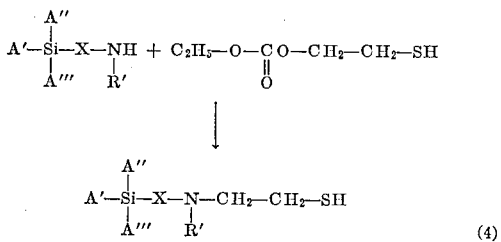
(4)

The methods of preparation shown above in Equations 3 and 4 are preferred over that of Equation 1 due to the higher yields obtainable. Furthermore, the formation of impurities resulting from self-condensation of the ethylene sulfide derivative is minimized.

The reaction shown in Equation 4 is particularly suitable for the preparation of monomeric compounds containing a plurality of mercaptan groups per molecule. Thus, for example, the following reaction provides compounds having 1, 2 and 3 mercaptan groups per molecule:

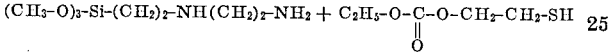

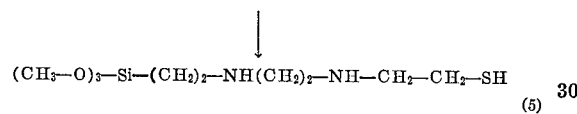
(5)

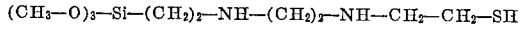
+
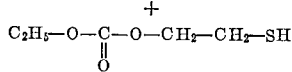

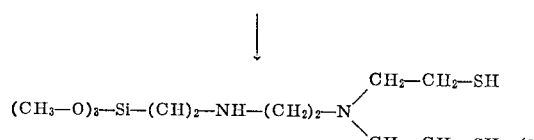
(6)

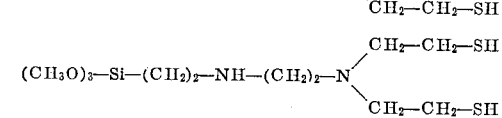
+
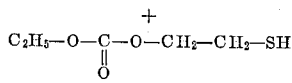

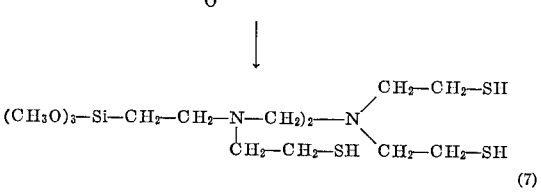
(7)

Comparing (5) above with Equation 1, it can be seen that "X" of Equation 1 is represented by the following radical:

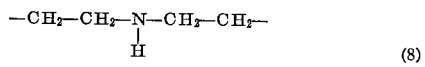
(8)

Comparing Equation 5 with Equation 1, it can be seen that "R'" in Equation 1 is represented by hydrogen.

With reference to Equation 6 it can be seen that the terminal nitrogen atom of the product is attached to two radicals having the following formula:

$$-CH_2-CH_2-SH \quad (9)$$

It will be recalled, that in defining "R'" in Equation 1, it was indicated that "R'" could be represented by the following radical:

(10)

Thus, it can be seen that the radical of Formula 9 is defined by radical of Formula 10 if "R" of Formula 10 is hydrogen. Going back to Equation 1, it will be noted that hydrogen is one of the groups from which "R" can be selected.

With reference to Equation 7 it can be seen that the end product has three mercaptan radicals attached to the two nitrogen atoms of the molecule. Thus, if the product of Equation 7 be compared with Equation 1, it will be seen that "X" of Equation 1 is represented by the following radical:

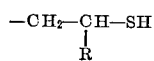
(11)

Organofunctional silanes may be made in monomeric form by resort to a different type of reaction than those described above. In the following equation it is shown how a conventional addition reaction may be used.

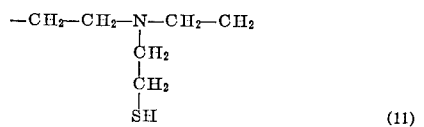

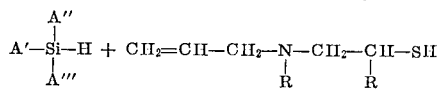
(12)

In the above reaction, an unsaturated alkyl mercaptoalkyl amine is reacted with a hydrogen silane. The groups A', A", A'" and R are chosen as described in Equation 1 above. Mercaptoalkyl alkenyl amines which are suitable for use in reactions of the type of Equation 12 are disclosed, for example, in U.S. Patent 2,998,451, issued to Hermann V. Boenig on August 29, 1961 (assigned to Goodyear Tire & Rubber Co.).

The monomeric organosilicon compounds described above all exhibit one common characteristic—at least one carbon atom separates the mercaptan group from the silicon atom. It is necessary that the mercaptan group be separated from the silicon atom in this manner to avoid a split of the molecule at this juncture.

DISULFIDES

As can be seen, all of the monomeric compounds set forth above under the heading "Monomers" contain at least one mercaptan group. Disulfide compounds can be readily prepared from any of the mercaptan compounds by oxidation thereof under mild conditions. Of course, as is well known, the disulfides can be re-converted into the corresponding mercaptan compounds by action of mild reducing agents.

In general the disulfide compounds contemplated by the present invention may be represented by the following formula:

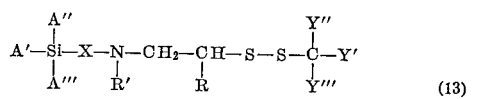
(13)

where A', A", A'", X and R' and R are as represented in connection with Equation 1 above, and Y', Y", Y'" are selected from the group consisting of hydrogen and substituted and unsubstituted aliphatic, aryl, and aralkyl groups. Of course, where R' is the mercaptan group, then a disulfide linkage can be formed through this radical as well to form a three dimensional polymer.

If the disulfide is to be formed by oxidation of a single monomer, then the disulfide will be as follows:

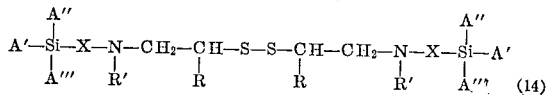
(14)

Of course, if a mixture of mercaptans is oxidized, then the disulfides which result will contain a number of unsymmetrical disulfides. In other words, if the mercaptan shown in Equation 2 is mixed with, for example, ethyl mercaptan, and the mixture is then oxidized, the resulting disulfides will contain molecules formed of mercaptan of Equation 2 and ethyl mercaptan. Such a disulfide would have the following formula:

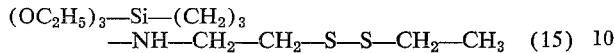
—NH—CH$_2$—CH$_2$—S—S—CH$_2$—CH$_3$  (15)

POLYMERS

The present invention contemplates monomeric compounds and polymeric compounds. The simplest polymeric compound contemplated by the present invention is in the form of a dimer. In a sense, the disulfides discussed above could be classified in that category.

Dimers of the present invention can be formed by reaction of two monomeric molecules which results in a linkage through the silicon atoms of the molecules. Thus, in the monomers set forth above, if the silicon atoms are connected to A', A'' and A''' by silicon carbon bonds, there will be little tendency for the silicon compound to hydrolyze at this point. In other words, such compounds will be stable to hydrolysis, and will not readily react under such conditions.

In the instance in which one of A', A'' and A''' is connected to the silicon atom through a hydrolyzable bond, then dimer formation is possible. Such would be the case if A', A'' or A''' was an alkoxy or substituted alkoxy group, for example.

Assume, for the purposes of this illustration, that A' is an alkoxy group and A'' and A''' are alkyl groups. The organosilicon compound would then be as shown in the following formula:

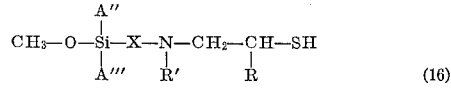

If the foregoing compound is exposed to hydrolyzing conditions, the following dimer is formed:

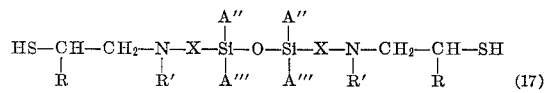

The dimer shown in Formula 17 can be oxidized to form a polymeric compound through the formation of disulfide linkages. In such instance the polymer formed would have a repeating group as follows:

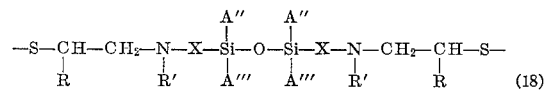

It will be readily seen that polymers of this invention may be formed of monomers set forth above in a slightly different manner. Thus, for example, the disulfide could first be formed from the organosilicon compound of Formula 16. Such a disulfide would have the following formula:

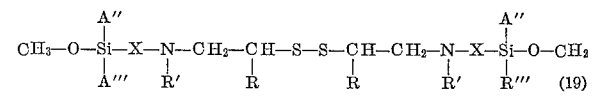

If such disulfide is then exposed to hydrolyzing conditions, a polymer would result having the following repeating structure.

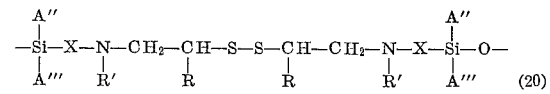

It is to be appreciated that very complicated polymeric compounds can be formed from the monomers contemplated by this invention. Thus, for example, in the instance where the monomer has a plurality of hydrolyzable groups attached to the silicon atoms, different polymers will result. If the organosilicon compound has two hydrolyzable groups attached to the silicon atom, linear polymers may be formed in a single step by exposing the monomer to hydrolyzing conditions. The repeating unit of a polymer formed in this manner from a monomer in which two of the groups attached to the silicon are hydrolyzable, could be schematically represented as follows:

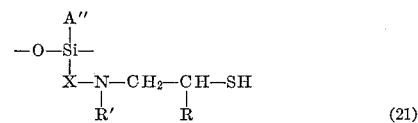

If the three groups attached to the silicon atom are hydrolyzable, complex three-dimensional polymers are formed under hydrolyzing conditions.

It can be appreciated that if monomers containing a plurality of hydrolyzable groups attached to the silicon atom are first oxidized to form the disulfides, then the polymers which result will have a different structure than that set forth above in Formulas 20 and 21.

In discussing the reactions through which monomers of this invention may be polymerized, the hydrolyzable group attached to the silicon atom has been described as being an alkoxy group. However, it is to be appreciated that other hydrolyzable groups such as halogen and thialkyl (—SR) will provide the same functionality.

In the discussion above concerning the formation of disulfide linkages to produce polymeric structures, the illustrative examples involve the oxidation of the thermal mercaptan group. As was indicated in the section discussing "Monomers" the radical R' can also include a mercaptan linkage. Thus, polymers could be formed through this linkage as well.

In addition to preparation of polymers from the monomers formed in accordance with the present invention, polymers can be formed directly in a single step. The following illustrates a general type of such reaction in which at least A' and A''' must be hydrolyzable:

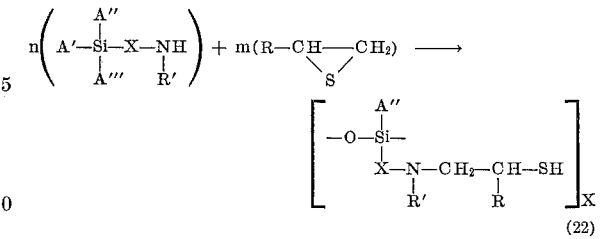

The presence of water or hydrogen ion is necessary to induce polymerization.

Typical of the general type of reaction set forth above in Equation 22 is the following reaction:

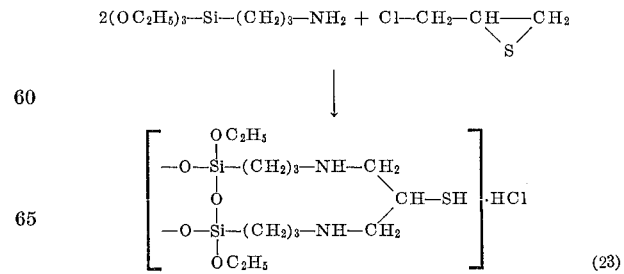

The hydrogen ion formed by alkylation of the amino group induces polymerization.

Reactions similar to reaction (23) may be carried out using ethylene monothiol carbonate or ethyl-2-mercapto ethyl carbonate in place of the sulfide.

The single step preparation of polymeric compounds of this invention, as indicated in the reaction above, is often advantageous when it is desired to prepare polymers in situ. In this case, a solution containing appropriate ratios of the monomers can be used to treat a material such as fibrous glass, and the polymerization is induced by evaporating the solvent and thus increasing the concentration of reactants.

As indicated above the preparation of the monomeric and polymeric silane compounds of the present invention can be carried out by several different methods. The method used in a particular instance will depend upon the specific structure desired, on the relative availability and cost of the starting materials, and on the use for which the compounds are intended.

The compounds in monomeric form are more soluble than the polymer, can be used in aqueous solution, and can be stored more readily than the polymer. Thus, in most instances, it would be desirable to prepare the monomer and store for future use.

In other instances, it may be desirable to make the polymer directly from the reactants in situ, thus avoiding the step of first preparing the monomer.

A major use of compounds of the present invention is for the treatment of glass in various forms. Thus, for example, glass in the form of fiber, yarn or fabric may be treated with the compounds of the present invention as a preliminary step in a bonding process in which the glass is to be bonded to a material, such as hydrocarbon rubber, which has an affinity for the mercaptan and/or disulfide linkages contained in the monomer. The compounds are also effective in bonding glass to other resinous compounds containing reactive functional groups, such as epoxy resins, unsaturated polyester resins, phenolic resins and the like.

With respect to forming a strong bond to a glass surface, the compounds of this invention should be in polymeric form. This can be accomplished in two ways. First, the monomer can be applied to the glass surface under hydrolyzing conditions. In this manner, the monomer will hydrolyze and polymerize directly on the glass surface. Alternatively, the polymer may be formed, either directly or by polymerization of the monomer, and the polymer applied to the glass.

In addition to the use of compounds of this invention for bonding glass to materials having affinity for sulfur, such as hydrocarbon rubbers, the compounds of this invention may also be used for improving the dyeability of glass fabrics with certain classes of dyes.

In short, the presence in a compound, either monomeric or polymeric, of (a) hydrolyzable groups attached to a silicon atom, thus imparting polymerization reactivity under hydrolyzing conditions; and (b) carbon linked mercaptan and/or disulfide linkages make such compounds useful in a variety of different applications.

The following examples are illustrative of the types of uses to which the compounds of the present invention may be put.

Example 1

Preparation of:

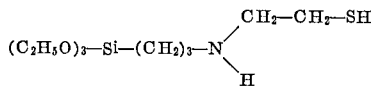

43.7 grams (0.42 mol) of ethylene monothiol carbonate were added dropwise with a stirring to a refluxing solution of 278 grams (1.26 mols) of gamma-aminopropyl triethoxy silane in 210 ml. of toluene. The mixture was refluxed with stirring for 17 hours, and the toluene was removed by distillation. Fractional distillation of the residue under reduced pressure yielded 92.2 grams (78% of the theoretical yield) of a water white liquid boiling at 104°–122° C. at 0.4–1.0 mm. which was N-beta mercaptoethylamino-propyl-triethoxy silane.

Example 2

Preparation of:

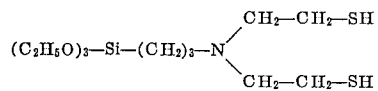

82 grams of the product of Example 1 (0.29 mol) were dissolved in 150 ml. of toluene, and the mixture was refluxed with stirring while 78 grams (0.75 mol) of ethylene monothiol carbonate were added dropwise after a period of 30 minues. After completing the addition, the mixture was refluxed for 15 hours. The toluene and volatile contaminants were removed from the reaction mixture by distillation under reduced pressure up to a pot temperature of 100° C. at 1 mm., leaving 92 grams of a clear colorless liquid which consisted essentially of the desired product.

Example 3

The product of Example 2 was also prepared directly from gamma aminopropyl triethoxy silane in the following manner. 93 grams (0.42 mol) were dissolved in 200 ml. of toluene, and the solution was heated to reflux with stirring. 87.4 grams (0.84 mol) of ethylene monothiol carbonate were then added dropwise over a period of 15 minutes. After refluxing for 15 hours, the reaction mixture was distilled under reduced pressure (to 0.3 mm.) until solvent and volatile components were removed.

Example 4

The product of Example 1 was oxidized to the corresponding disulfide:

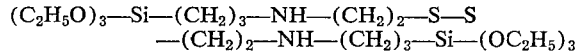

in the following manner. 50 ml. of an 8.8% solution of iodine in benzene (0.0175 mol iodine) were added to a solution of 10 grams (0.033 mol) of the product of Example 1 in 50 grams of benzene. After the solution had been allowed to stand for a few minutes at room temperature titration with sodium thiosulfate indicated that no mercapto groups remained. The hydrogen iodide was removed from the reaction mixture by adding 6.4 ml. of a 50% solution of triethylamine in benzene, and filtering off the precipitated triethylamine hydroiodide. The filtrate was stripped to remove the solvent, and the disulfide was obtained as a mercaptan-free dark viscous liquid.

Example 5

Preparation of copolymer of 3-chloropropylene sulfide-1,2 and gamma-aminopropyl triethoxy silane.

0.5 ml. of 3-chloropropylene sulfide-1,2 and 1.5 ml. of gamma-aminopropyl triethoxy silane were mixed in a tightly closed tube. After a few minutes the reaction mixture became warm and began to increase in viscosity. After two days at room temperature, an extremely viscous semisolid product was obtained. After 19 days at room temperature a soft, tacky viscoelastic material resembling a plasticized uncured rubber had formed.

Example 6

Preparation of copolymer of 3-chloro-propylene sulfide and gamma-aminopropyl triethoxy silane.

0.5 ml. of 3-chloropropylene sulfide-1,2, 1.5 ml. of gamma-aminopropyl triethoxy silane and 8 ml. of methyl ethyl ketone solvent were mixed in a tightly capped tube. The solution became hazy almost immediately, and a white powder began to precipitate, the amount gradually increasing as the reaction mixture was allowed to stand at room temperature. After 5 days at room temperature, the precipitate was filtered, washed with methyl ethyl ketone and dried in vacuo to constant weight. The product weighed 0.47 gram, and its analysis gave the following results.

Found: Percent N, 10.0; percent S, 5.54; percent Cl, 13.7.

Example 7

Under conditions similar to those described in Example 6, but employing different ratios of 3-chloropropylene sulfide (CPS) and gamma-aminopropyl triethoxy silane (APTES) in methyl ethyl ketone solution, the copolymers obtained had similar composition (despite the different monomer ratios used), as shown by the following analytical results.

| Volume ratio GPS/APTES | Reaction Conditions | Percent N | Percent S | Percent Si | Percent Cl |
|---|---|---|---|---|---|
| (A) 1/9 | 90 min. 58° C | 8.04 | 3.49 | 18.26 | 16.27 |
| (B) 1/3 | 22 hrs. 25° C | 7.93 | 3.17 | 17.55 | 16.77 |

Example 8

Copolymer of 3-chloropropylene sulfide-1,2 and beta (aminoethylamino) ethyl trimethoxy silane.

1 ml. of 3-chloropropylene sulfide and 1 ml. of beta (aminoethyl-amino) ethyl trimethoxy silane were mixed while cooling in an ice bath to avoid violent reaction. After one hour at 25° C., the reaction mixture formed a pale yellow insoluble gel. When the experiment was repeated with 0.5 ml. of 3-chloropropylene sulfide and 1 ml. of beta (aminoethylamino) ethyl trimethoxy silane, a viscous amber liquid was obtained.

Example 9

(A) 1 ml. of 3-chloropropylene sulfide and 1 ml. of beta (aminoethylamino) ethyl trimethoxy silane were dissolved in 8 ml. of methyl ethyl ketone, and the mixture was allowed to stand at room temperature for 2 days. The brown precipitate formed was filtered, washed with acetone and dried. 1.1 grams of this polymer were obtained. (B) The experiment of Example 9(A) was repeated using 1.5 ml. of 3-chloropropylene sulfide and 0.5 ml. of beta (aminoethylamino) ethyl trimethoxy silane. The yield of polymer was 0.36 gram. The analysis of samples (A) and (B) gave the following results.

|  | Percent N | Percent S |
|---|---|---|
| Copolymer (A) | 8.39 | 7.2 |
| Copolymer (B) | 7.51 | 6.41 |

Example 10

About 10% of water was worked into the soft rubbery product of Example 5 without changing its consistency appreciably. When the hydrated mass was cured at 110° C. for 10 minutes, it was converted to a friable, colorless rubbery product.

Example 11

When a film obtained from the product of Example 5 was cured in a forced draft oven at 110° C. for 45 minutes, it became harder, less extensible and non-tacky, indicating that curing had taken place.

Example 12

A copolymer was prepared by the procedure described in Example 5 from equal volumes of 3-chloropropylene sulfide and gamma-aminopropyl triethoxy silane in absence of diluent or solvent. A portion of the viscous liquid so obtained was cured at 110° C. for 45 minutes, yielding a clear hard polymer which adhered well to glass. 10% water was added to a second portion of the viscous liquid copolymer, and the resulting cloudy white liquid was cured in two minutes at 110° C. to a soft, friable, opaque white gel which appeared unaffected by further heating.

Example 13

2% water was added to a freshly prepared mixture of equal volumes of 3-chloropropylene sulfide and gamma-aminopropyl triethoxy silane at 25° C. The reaction mixture immediately became warm, and after 10 minutes evolved steam violently, forming a soft, porous, slightly elastic friable white solid.

Example 14

A 2% aqueous solution of the product of Example 1 was adjusted to pH 3.0 with acetic acid. A sample of woven fiberglass fabric was impregnated with this solution on a laboratory padder, and dried in a forced draft oven at 250° F. for 10 minutes. The fabric so treated had excellent adhesion to rubber (see examples below). The aqueous solution employed in this example remained free of precipitate after a week's storage at room temperature.

Example 15

A 2% solution of the product of Example 1 was prepared in xylene, and acetic acid was added in an amount comparable to that used in Example 14. A sample of woven fiberglass fabric was impregnated with the solution on a laboratory padder, and dried for 10 minutes at 250° F. The fabric so treated exhibited adhesion to rubber comparable to the fabric treated from aqueous solution as described in Example 14 (see examples below).

Example 16

A sample of woven fiberglass was treated with a 2% xylene solution of the product of Example 2 by padding, and drying for 10 minutes at 250° F.

Example 17

The woven glass fabric samples prepared as described in Examples 14, 15, and 16 were tested for adhesion to natural rubber (sulfur cured) by treating with a standard rubber compound formulation, curing for 20 minutes at 307° F., and subjecting strips of the rubber/fabric samples to a peel test. The peel test used was a modification of the test for adhesion of rubber to rubber designated as ASTM Test Method B–413–39. In the test as modified, the glass fabric sample was molded between rubber faces. The results obtained are summarized in the table below.

| Glass Fabric Sample | Glass Rubber Adhesion, lbs./inch | Remarks |
|---|---|---|
| A. Example 14 | 65 | Rubber failure. |
| B. Example 15 | 60 | Do. |
| C. Example 16 | 35 |  |
| D. Treated with gamma-amino-propyl triethoxy silane. | 11 |  |
| E. Treated with epoxy silane Z-6040 (Dow Corning). | 6 |  |
| F. Control (heat cleaned only) | 3 |  |

The outstanding adhesion to rubber of the glass fabrics treated in Examples 14, 15, 16 is demonstrated by these results.

Example 18

The dyeability of glass fabric samples prepared in Examples 14 and 15 was evaluated by dyeing with 2% each of the following dyestuffs.

Dyestuff: Color index designation
  (a) Eastone Brown 2R _____ Disperse Orange 5.
  (b) Fast Acid Violet RL Conc. _____ Acid Violet 1.
  (c) Belamine Fast Red 8BL–125% _ Direct Red 81.
  (d) Procion Brilliant Blue H5GS ___ Fiber Reactive.

Standard dyeing procedures were used for each of the above dyestuffs, and the variations in shade shown in the table below were recorded.

| Glass Fabric Sample | Dyestuff Sample | | | |
|---|---|---|---|---|
| | (a) | (b) | (c) | (d) |
| A. Example 14 | Excellent | Excellent | Fair | Good. |
| B. Example 15 | do | do | do | Do. |
| D. Treated with gamma aminopropyl triethoxy silane. | Staining | Nil | Staining | Do. |
| E. Treated with epoxy silane Z-6040 (Dow Corning). | Good | Nil | Slight stain | Slight stain. |
| F. Control (heat cleaned only). | Slight stain | Nil | do | Do. |

It is apparent that treatment of glass fabric with compounds of the present invention substantially enhance dye receptivity.

It is to be noted that each of the organosilicon compounds of the above examples embodies at least one carbon-linked amino nitrogen. The amino nitrogen is present due to the use of amino silanes. It is believed that the presence of such amino nitrogen groups enhances the characteristics of the compounds, by, for example, increasing the dye receptivity of treated glass surfaces and increasing the reactivity and catalytic activity of the organosilicon compounds when used in epoxy resin-glass systems.

In the illustrative embodiments and examples described above, certain specific sulfur-containing compounds are used. It is to be understood that these specific compounds are representative members of the following generic groups:

(1) Monothiol carbonates
(2) Organic epi-sulfides
(3) Mercaptoalkyl alkyl carbonates Accordingly, other members of the above three groups can be successfully employed in the practice of the present invention.

The present invention contemplates a novel group of compounds, both monomeric and polymeric which preferably contain at least two different active functional groups. Providing at least one hydrolyzable group attached to the silicon atom furnishes a site which is useful for reacting with a surface such as glass. In addition, the presence of mercaptan and/or disulfide linkages provides reactivity sites which can be used to link these compounds with materials which have an affinity for sulfur, such as hydrocarbon rubber or other vulcanizable materials.

The invention disclosed in the illustrative examples and in the specification may be modified by one skilled in the art without departing from the spirit and scope of the present invention.

What is claimed is:

1. A compound having the formula:

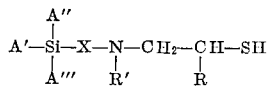

where A', A" and A''' are selected from the group consisting of substituted and unsubstituted aliphatic, aryl, aralkyl radicals and hydrolyzable radicals; X is selected from the group consisting of a divalent organic radical having terminal carbon atoms and —CH$_2$—; R is selected from the group consisting of hydrogen, substituted and unsubstituted aliphatic, aryl and aralkyl radicals; and R' is selected from the group consisting of hydrogen, substituted and unsubstituted aliphatic radicals, and the following group:

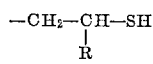

2. The compound of claim 1 in which at least two of A', A" and A''' are hydrolyzable.

3. A compound having the following formula:

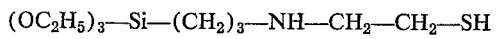

4. The method of producing an organofunctional silane containing a mercapto radical comprising the step of reacting a first reagent having the following formula:

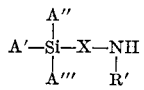

where A', A" and A''' are selected from the group consisting of substituted and unsubstituted aliphatic, aryl, aralkyl and alkoxy radicals and at least one of them is an alkoxy radical; X is selected from the group consisting of a divalent organic radical having terminal carbon atoms and —CH$_2$—; R is selected from the group consisting of hydrogen, substituted and unsubstituted aliphatic, aryl and aralkyl radicals; and R' is selected from the group consisting of hydrogen, substituted and unsubstituted aliphatic radicals, and the following group:

—CH$_2$—CH—SH
         |
         R with a second reagent selected from the group consisting of monothiol carbonates, organic epi-sulfides and mercaptoalkyl alkyl carbonates.

5. The method of claim 4 in which said second reagent has the following formula:

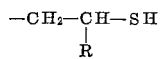

6. The method of claim 4 in which said second reagent has the following formula:

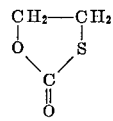

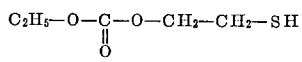

7. The method of claim 4 in which said second reagent has the following formula:

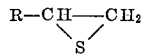

where R is selected from the group consisting of hydrogen, and substituted and unsubstituted aliphatic, aryl and aralkyl radicals.

8. The method of claim 4 in which said second reagent has the following formula:

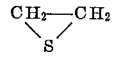

9. The method comprising the step of reacting a first reagent having the following formula:

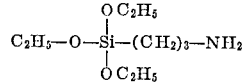

with a second reagent having the following formula:

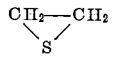

to form a silane containing a mercaptan group.

10. The method comprising the step of reacting a first reagent having the following formula:

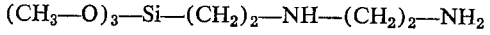

with a second reagent having the following formula:

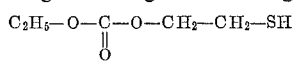

to form a silane containing a mercaptan group.

11. The method comprising the step of reacting a first reagent having the following formula:

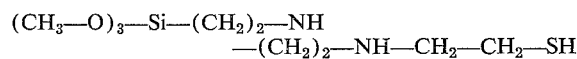

with a second reagent having the following formula:

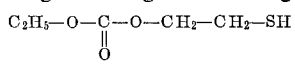

to form a silane containing a mercaptan group.

12. The method comprising the step of reacting a first reagent having the following formula:

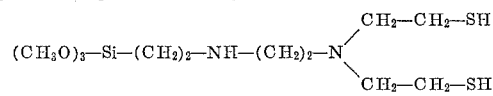

with a second reagent having the following formula:

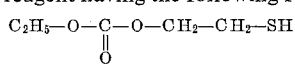

to form a silane containing a mercaptan group.

13. A disulfide compound having the following formula

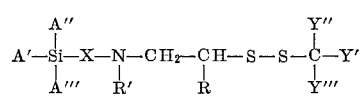

where A′, A″ and A‴ are selected from the group consisting of substituted and unsubstituted aliphatic, aryl, aralkyl radicals and hydrolyzable radicals; X is selected from the group consisting of a divalent organic radical having terminal carbon atoms and —CH$_2$—; R is selected from the group consisting of hydrogen, substituted and unsubstituted aliphatic, aryl and aralkyl radicals; and R′ is selected from the group consisting of hydrogen, substituted and unsubstituted aliphatic radicals, and the following group:

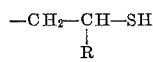

and where Y′, Y″ and Y‴ are selected from the group consisting of hydrogen and substituted and unsubstituted aliphatic, aryl, and aralkyl groups.

14. A compound having the following formula:

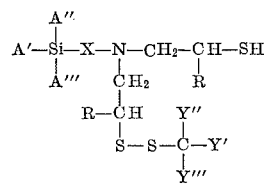

where A′, A″ and A‴ are selected from the group consisting of substituted and unsubstituted aliphatic, aryl, aralkyl and alkoxy radicals; X is selected from the group consisting of a divalent organic radical having terminal carbon atoms and —CH$_2$—; R is selected from the group consisting of hydrogen, substituted and unsubstituted aliphatic, aryl and aralkyl radicals, and where Y′, Y″ and Y‴ are selected from the group consisting of hydrogen and substituted and unsubstituted aliphatic, aryl, and aralkyl groups.

15. A disulfide compound having the following formula

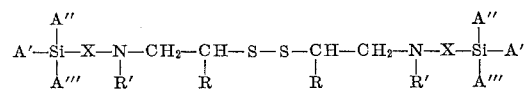

where A′, A″ and A‴ are selected from the group consisting of substituted and unsubstituted aliphatic, aryl, aralkyl radicals and hydrolyzable radicals; X is selected from the group consisting of a divalent organic radical having terminal carbon atoms and —CH$_2$—; R is selected from the group consisting of hydrogen, substituted and unsubstituted aliphatic, aryl and aralkyl radicals; and R′ is selected from the group consisting of hydrogen, substituted and unsubstituted aliphatic radicals, and the following group:

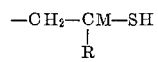

16. The dimeric compound of claim 15 in which there is at least one hydrolyzable group attached to each of the said silicon atoms.

17. An organosilicon polymeric compound comprising a first repeating group having the following formula:

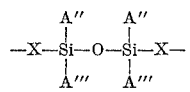

wherein A″ and A‴ are selected from the group consisting of substituted and unsubstituted aliphatic, aryl, and aralkyl radicals, and X is selected from the group consisting of a divalent organic radical having terminal carbon atoms and —CH$_2$— and a second repeating group having the following formula:

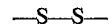

the said first and said second repeating groups being alternately positioned in said polymeric compound and being separated through a linkage having terminal carbon atoms and consisting of substituted or unsubstituted aliphatic hydrocarbon groups and at least one amino nitrogen.

18. An organosilicon polymeric compound comprising a repeating group having the following formula:

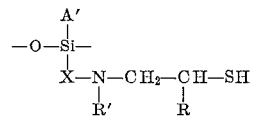

where A′ is selected from the group consisting of substituted and unsubstituted aliphatic, aryl and aralkyl radicals; X is selected from the group consisting of a divalent organic radical having terminal carbon atoms and —CH$_2$—; R is selected from the group consisting of hydrogen, substituted and unsubstituted aliphatic, aryl and aralkyl radicals; and R′ is selected from the group consisting of hydrogen, substituted and unsubstituted aliphatic radicals, and the following group;

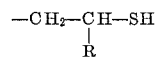

19. An organosilicon compound having the following formula:

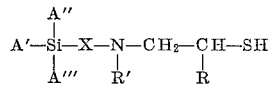

where A′, A″ and A‴ are hydrolyzable radicals; X is selected from the group consisting of a divalent organic radical having terminal carbon atoms and —CH$_2$—; R is selected from the group consisting of hydrogen, substituted and unsubstituted aliphatic, aryl and aralkyl radicals; and R′ is selected from the group consisting of hydrogen, substituted and unsubstituted aliphatic radicals, and the following group;

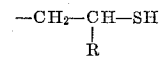

20. The compound of claim 19 in which A′, A″ and A‴ are alkoxy radicals.

21. The polymer formed by subjecting the compound of claim 30 to hydrolyzing conditions.

22. An organosilicon polymer formed by subjecting to hydrolyzing conditions a dimer having the following formula:

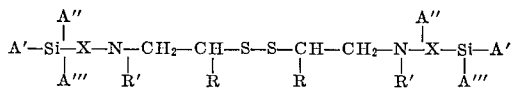

where A′, A″ and A‴ are selected from the group consisting of substituted and unsubstituted aliphatic, aryl, aralkyl radical and hydrolyzable radicals and where at least one of A′, A″ and A‴ is hydrolyzable; X is selected from the group consisting of a divalent organic radical having terminal carbon atoms and —CH$_2$—; R is selected from the group consisting of hydrogen, substituted and unsubstituted aliphatic, aryl and aralkyl radicals, and R′ is selected from the group consisting of hydrogen, substituted and unsubstituted aliphatic radicals, and the following group:

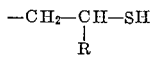

23. The method of producing an organofunctional silane containing a mercapto radical in which at least one carbon atom separates the sulfur atom of the mercapto radical and the silicon atom of the silane and said silicon atom has attached thereto at least one hydrolyzable group, comprising the step of reacting an amino silane having at least one hydrolyzable group attached to the silicon atom with a compound selected from the group consisting of monothiol carbonates, organic epi-sulfides and mercaptoalkyl alkyl carbonates.

24. The method of claim 23 in which said organofunctional silane is a polymer and the repeating group contains both a silicon atom and a sulfur atom, the latter atoms being separated through a linkage having terminal carbon atoms and consisting of substituted or unsubstituted aliphatic hydrocarbon groups and at least one amino nitrogen.

25. The method of producing an organofunctional silane containing a mercapto radical comprising the step of reacting a first reagent having the following formula:

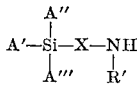

where A′, A″ and A‴ are selected from the group consisting of substituted and unsubstituted aliphatic, aryl, aralkyl and alkoxy radicals and where at least two of A′, A″ and A‴ are hydrolyzable; X is selected from the group consisting of a divalent organic radical having terminal carbon atoms and —CH$_2$—; R is selected from the group consisting of hydrogen, substituted and unsubstituted aliphatic, aryl and aralkyl radicals; and R′ is selected from the group consisting of hydrogen, substituted and unsubstituted aliphatic radicals, and the following group:

—CH$_2$—CH—SH
       |
       R with a second reagent selected from the group consisting of monothiol carbonates, organic epi-sulfides and mercaptoalkyl alkyl carbonates.

26. The method of claim 25 in which said second reagent has the following formula:

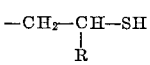

27. The method of claim 25 in which said second reagent has the following formula:

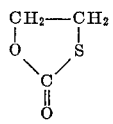

28. The method of claim 25 in which said second reagent has the following formula:

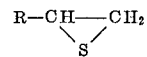

where R is selected from the group consisting of hydrogen, and substituted and unsubstituted aliphatic, aryl and aralkyl radicals.

29. The method of producing a polymeric organofunctional silane comprising the step of reacting under hydrolyzing conditions a first reagent having the following formula:

$(OC_2H_5)_3$—Si—$(CH_2)_3$—$NH_2$ with a second reagent having the following formula:

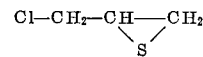

30. A compound having the following formula:

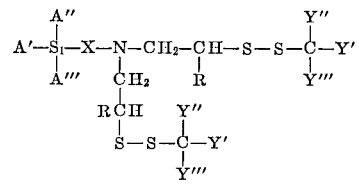

where A′, A″ and A‴ are selected from the group consisting of substituted and unsubstituted aliphatic, aryl, aralkyl and alkoxy radicals; X is selected from the group consisting of a divalent organic radical having terminal carbon atoms and —CH$_2$—; R is selected from the group consisting of hydrogen, substituted and unsubstituted aliphatic, aryl and aralkyl radicals, and where Y′, Y″ and Y‴ are selected from the group consisting of hydrogen and substituted and unsubstituted aliphatic, aryl, and aralkyl groups.

31. An organosilicon polymer compound comprising a repeating group having the following formula:

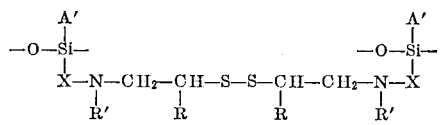

where A′ is selected from the group consisting of substituted and unsubstituted aliphatic, aryl and aralkyl radicals; X is selected from the group consisting of a divalent organic radical having terminal carbon atoms and —CH$_2$—; R is selected from the group consisting of hydrogen, substituted and unsubstituted aliphatic, aryl and aralkyl radicals; and R′ is selected from the group consisting of hydrogen, substituted and unsubstituted aliphatic radicals, and the following group:

—CH$_2$—CH—SH
       |
       R

32. The method of producing a polymeric organofunctional silane containing a mercapto radical comprising the step of reacting under hydrolyzing conditions a first reagent having the following formula:

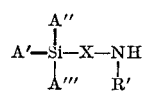

where A′, A″ and A‴ are selected from the group consisting of substituted and unsubstituted aliphatic, aryl, aralkyl and alkoxy radicals and where at least two of A′, A″ and A‴ are hydrolyzable; X is selected from the group consisting of a divalent organic radical having terminal carbon atoms and —CH$_2$—; R is selected from the group consisting of hydrogen, substituted and unsubstituted aliphatic, aryl and aralkyl radicals; and R′ is selected from the group consisting of hydrogen, substituted and unsubstituted aliphatic radicals, and the following group:

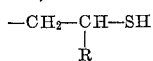

with a second reagent selected from the group consisting of monothiol carbonates, organic epi-sulfides and mercaptoalkyl alkyl carbonates.

33. An organosilicon dimeric compound of the formula:

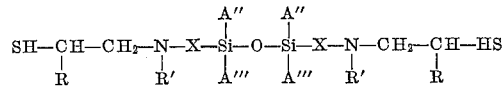

wherein A″ and A‴ are selected from the group consisting of substituted and unsubstituted aliphatic, aryl and aralkyl radicals; X is selected from the group consisting of divalent organic radicals having terminal carbon atoms and —CH₂—; R is selected from the group consisting of hydrogen, substituted and unsubstituted aliphatic, aryl and aralkyl radicals; and R′ is selected from the group consisting of hydrogen, substituted and unsubstituted aliphatic radicals and the following group:

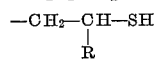

34. The organosilicon polymeric compound formed by subjecting the dimeric compound of claim 33 to oxidizing conditions.

35. The polymeric compound formed by oxidizing a compound having the formula:

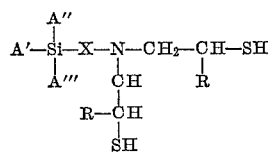

wherein A′, A″ and A‴ are selected from the group consisting of substituted and unsubstituted aliphatic, aryl, aralkyl and alkoxy radicals; X is selected from the group consisting of a divalent organic radical having terminal carbon atoms and —CH₂—; and R is selected from the group consisting of hydrogen, substituted and unsubstituted aliphatic, aryl and aralkyl radicals.

References Cited by the Examiner
UNITED STATES PATENTS

| | | | |
|---|---|---|---|
| 2,751,314 | 6/1956 | Keil | 117—72 |
| 2,823,218 | 2/1958 | Speier et al. | 260—448.2 |
| 2,856,387 | 10/1958 | Jacobson et al. | 260—79 |
| 2,902,389 | 9/1959 | Keil | 117—72 |
| 2,919,172 | 12/1959 | Lawsberg | 8—8 |
| 2,919,173 | 12/1959 | Roff | 8—8 |
| 2,938,046 | 5/1960 | Morehouse | 260—448.2 |
| 2,959,569 | 11/1960 | Warrick | 260—448.2 |
| 2,960,492 | 11/1960 | Morton et al. | 260—46.5 |
| 2,998,406 | 8/1961 | Bailey et al. | 260—46.5 |
| 2,998,451 | 8/1961 | Boenig | 260—577.5 |
| 3,072,676 | 1/1963 | Johnson et al. | 260—79 |

FOREIGN PATENTS 1,137,238   1/1957   France.

OTHER REFERENCES

Reid: Organic Chemistry of Bivalent Sulfur, vol. III, Chemical Publishing Company, N.Y., 1960, pp. 16–17.

Decker et al.: Journal of Organic Chemistry, vol. 25, No. 2, February 1960, pp. 249–252, 260/448.2, QD 241.J6.

LEON J. BERCOVITZ, *Primary Examiner*.

WILLIAM H. SHORT, MURRAY TILLMAN,
*Examiners.*

M. I. MARQUIS, *Assistant Examiner*.